(12) United States Patent
Auffret

(10) Patent No.: US 6,778,775 B1
(45) Date of Patent: Aug. 17, 2004

(54) VIDEO CAMERA WITH FLAT SCREEN VIEWFINDER

(75) Inventor: Eric Auffret, Noyal sur Vilaine (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/535,988

(22) Filed: Mar. 27, 2000

(30) Foreign Application Priority Data

Apr. 7, 1999 (FR) ............................................. 99 04334

(51) Int. Cl.⁷ ............................................... G03B 13/02
(52) U.S. Cl. ........................ 396/374; 396/383; 352/131; 348/333.06
(58) Field of Search ...................... 348/333.06; 396/374, 396/383, 422; 352/131

(56) References Cited

U.S. PATENT DOCUMENTS 5,119,203 A * 6/1992 Hosaka et al. ............... 348/375
5,801,774 A * 9/1998 Seo ......................... 348/333.06

FOREIGN PATENT DOCUMENTS

| DE | 6945813 | 4/1970 |
|----|---------|--------|
| DE | 19622802 | 12/1996 |
| EP | 661871 | 7/1995 |
| FR | 2756939 | 6/1998 |

OTHER PUBLICATIONS

Die PSL–Systeme Fur Die Digitale Bildproduktion, MFM Fototechnik, vol. 44 No. 2, Feb. 1, 1996, pp. 18–20 (Translation enclosed).

* cited by examiner

Primary Examiner—David M. Gray
(74) Attorney, Agent, or Firm—Joseph S. Tripoli; Harvey D. Fried; Francis A. Davenport

(57) ABSTRACT

The invention proposes a camera 1 furnished with a flat screen viewfinder 4 which comprises a specific fixing system. The fixing system essentially comprises a boom 5 for connecting the viewfinder 4 and the camera body 2. The boom 5 is connected on the one hand to the camera body 2 and on the other hand to the viewfinder 4 by fixing means 6 and 7 allowing fine-tuning and positional retention. According to one embodiment, the boom 5 extends towards the rear of the camera 1 so that a possible position of the viewfinder 4 lies in the extension of the lens 3.

16 Claims, 4 Drawing Sheets

VIDEO CAMERA WITH FLAT SCREEN VIEWFINDER

FIELD OF THE INVENTION

The invention relates to a video camera with flat screen viewfinder. More particularly, the invention concerns professional video cameras.

A video camera uses a viewfinder to allow the cameraman to view what he is filming. Depending on the type of camera, a viewfinder with eyepiece or a viewfinder with screen is used. Viewfinders having a screen are used especially on pod-mounted professional cameras so as to allow the cameraman to be able to use the viewfinder whilst being able to watch other indicators.

PRIOR ART OF THE INVENTION

The viewfinders of professional cameras are cathode-ray tube screens of small dimensions placed above the camera. However, the position of the viewfinder above the camera poses two problems. A first problem is a defect of parallax which may deceive the cameraman during sighting. A second problem is related to the cameraman who has continuously to raise his head in order to carry out sighting, which may, over time, damage the cervical vertebrae.

It is not possible to place a cathode-ray tube viewfinder in the extension of the camera. This is because adding a cathode-ray tube alligned with the sighting axis of the camera would have the effect of lengthening the body of the camera considerably. On the other hand, it is possible to use a flat screen, the depth of which is markedly smaller, flat screens being used moreover for amateur cameras.

SUMMARY OF THE INVENTION

The invention proposes a camera furnished with a flat screen viewfinder which comprises a specific fixing system. The fixing system essentially comprises a boom for connecting the viewfinder and the body of the camera. The boom is connected on the one hand to the camera and on the other hand to the viewfinder by fixing means allowing fine-tuning and positional retention.

The subject of the invention is a video camera comprising a camera body; a lens fixed on the camera body; a viewfinder of the flat screen type; a boom which is connected by a first end to the camera body and by a second end to the viewfinder; a first fixing means for connecting the boom to the camera body, the said first means allowing on the one hand adjustment of positioning and on the other hand retention in position; a second fixing means for connecting the boom to the viewfinder, the said second means allowing on the one hand adjustment of positioning and on the other hand retention in position. Preferably, the boom extends towards the rear of the camera so that a possible position of the viewfinder lies in the extension of the optical axis of the lens.

BRIEF DESCRIPTION OF THE DRAWINGS

The invention will be better understood and other features and advantages will become apparent on reading the description which follows, the said description making reference to the following figures.

DETAILED DESCRIPTION

In the various FIGS. 1 to 8, one and the same label is used to designate one and the same object carrying out the same function.

Figure 1:
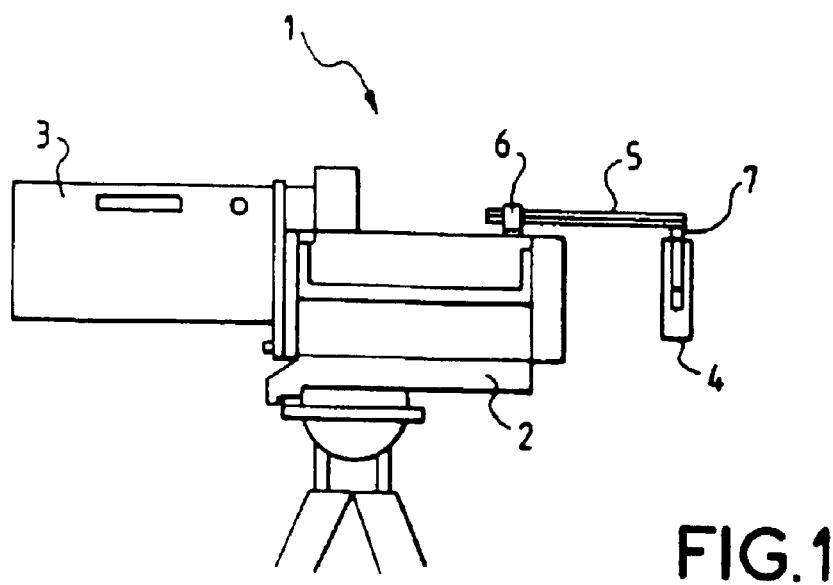
FIG. 1 diagrammatically represents a camera according to the invention.

FIG. 1 represents a kinematic diagram of a video camera 1 of professional type. The camera 1 comprises mainly a camera body 2, a lens 3 placed on the front of the body 2, and a viewfinder 4 of the flat screen type placed towards the rear of the camera 1. The viewfinder 4 is connected to the body of the camera 2 by way of a boom 5.

The boom 5 is fixed to the body 2 by way of a first fixing means 6 consisting of a sliding link (allowing translation) furnished with clamping means for retaining the boom 5 in a fixed position in relation to the body 2 when adjustment is performed. The boom 5 is fixed to the viewfinder 4 by way of a second fixing means 7 consisting of a ball and socket link (allowing three degrees of freedom in rotation) furnished with clamping means for retaining the boom 5 in a fixed position with respect to the viewfinder 4 when adjustment is performed.

Figure 2:
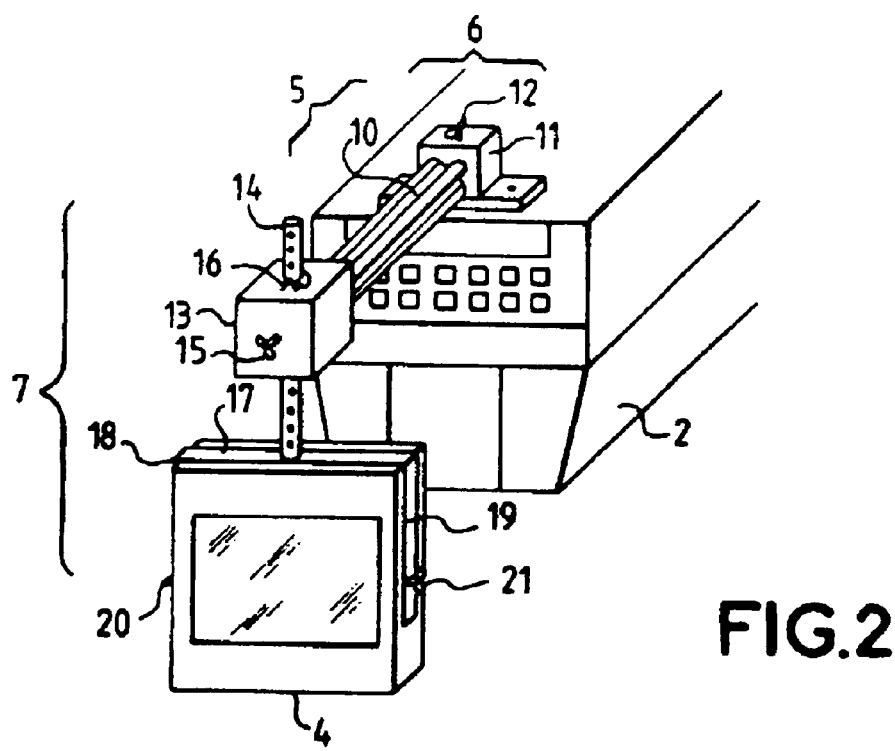
FIG. 2 represents the rear of the camera according to a preferred embodiment of the invention.

FIG. 2 represents in more detail the rear of the camera 1, according to a preferred embodiment. In this instance, the boom 5 consists essentially of a rail 10. Preferably, the rail 10 is a regular X-shaped or square-shaped member or one of any other shape whose profile is identical after a 90° rotation so as to allow at least four mounting positions. However, if the person skilled in the art does not wish to have at least four mounting positions, any type of member can be used.

The first fixing means 6 comprises a slider 11 securely attached to the body 2, for example with the aid of screws, and a first tightening thumbwheel 12. The slider 11 comprises a first opening whose shape corresponds to the profile of the rail 10, so that the rail 10 can slide in the slider 11. Th slider 11 also comprises a hole furnished with a screw thread which emerges into the opening so as to receive the first tightening thumbwheel 12. Thus, when the rail 10 is placed in the opening, an action on the first thumbwheel 12 results in a pressure on the rail 10 which clamps by braking any translation of the rail 10 with respect to the slider 11 and hence with respect to the camera body 2.

The second fixing means 7 is here limited to two rotations, the third rotation being obtained in this embodiment by the various positions of the rail 10 with respect to the slider 11. The second fixing means 7 comprises a support 13 securely attached to the rail 10, for example with the aid of screws. The support 13 is furnished on the one hand with a first circular hole whose axis is for example perpendicular to the axis of the rail 10 and on the other hand with a second hole comprising a screw thread, the second hole emerging into the first hole. The second fixing means 7 furthermore comprises a rod 14, of circular section, mounted in the first hole of the support 13 so as to permit a rotation of the rod 14 with respect to the support 13. A second tightening thumbwheel 15 is placed in the second hole of the support 13 so as to immobilize the rod 14 with respect to the support 13 by tightening. As may be observed by the person skilled in the art, the rod 14 mounted in the support 13 also has a translational degree of freedom which is also clamped by the second thumbwheel 15. For safety's sake, the rod 14 is drilled with a plurality of holes so as to allow translational clamping with multiple positioning with the aid of a pin fastener 16 which is for example a beta pin.

The second fixing means 7 comprises a gantry 17, secured to the rod 14, having two arms 18 and 19 which extend along two opposite sides of the viewfinder 4. The gantry 17 is furnished with two coaxial holes, one on each of the arms 18 and 19. The two coaxial holes are placed on the arms 18 and 19 so as to lie opposite two holes furnished with screw threads, placed on the two opposite sides of the viewfinder 4. Third and fourth tightening thumbwheels 20 and 21 pass through the two holes of the gantry 17 so as to screw into the viewfinder 4. When the third and fourth thumbwheels 20 and 21 are not tightened, the viewfinder 4 can then turn about an axis preferably perpendicular to the axis of the rod 14. The tightening of the third and fourth thumbwheels 20 and 21 has the effect of immobilizing the viewfinder 4 with respect to the gantry 17.

Figure 3:
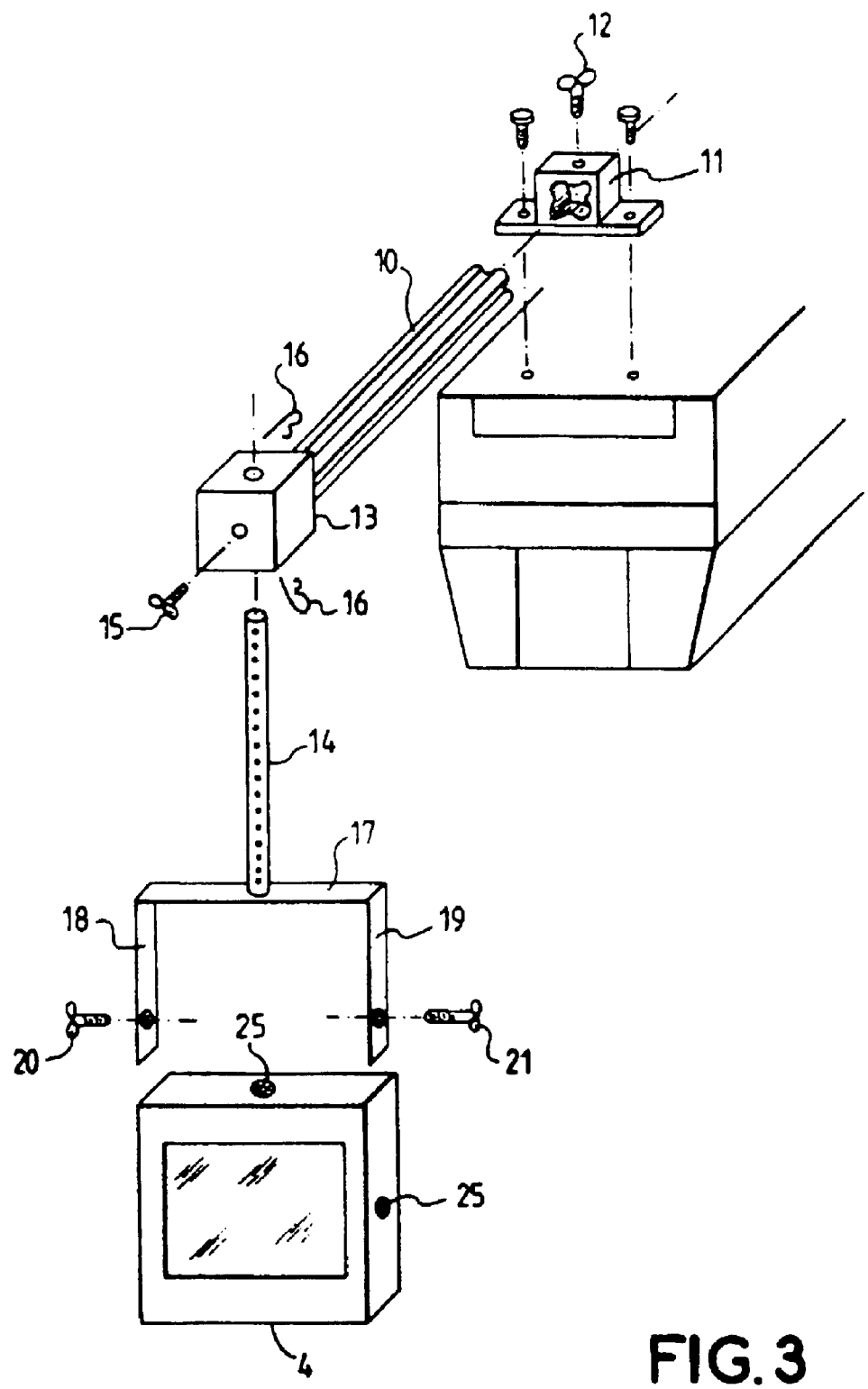
FIG. 3 represents an exploded view of FIG. 2, FIGS. 4 and 5 represent two particular positions of the viewfinder according to the invention.

FIG. 3 represents the device of FIG. 2 in an exploded view. So as not to overburden the drawing, the fixing screws are represented solely by their axes. Moreover, this exploded view makes it possible to depict certain details which do not appear in FIG. 2. Thus, the person skilled in the art will observe that the viewfinder 4 of square shape has four holes 25 furnished with screw threads, respectively one on each of the sides so as to be able to ensure mounting according to several orientations as may be seen in FIGS. 4 and 5. The person skilled in the art will observe that, although the viewfinder is of square shape, the screen of the viewfinder can very well be in the 4/3 or 16/9 format.

The four holes 25 and also the two holes of the gantry 17 have a shoulder with radial striations so as to improve the clamping of the viewfinder 4 with respect to the gantry 17. The radial striations allow rotational clamping without requiring recourse to significant tightening of the thumbwheels 20 and 21.

It may also be seen that the support 13 is not necessarily machined on the rail 10 and can constitute an add-on piece fixed for example by screws.

Figure 4:
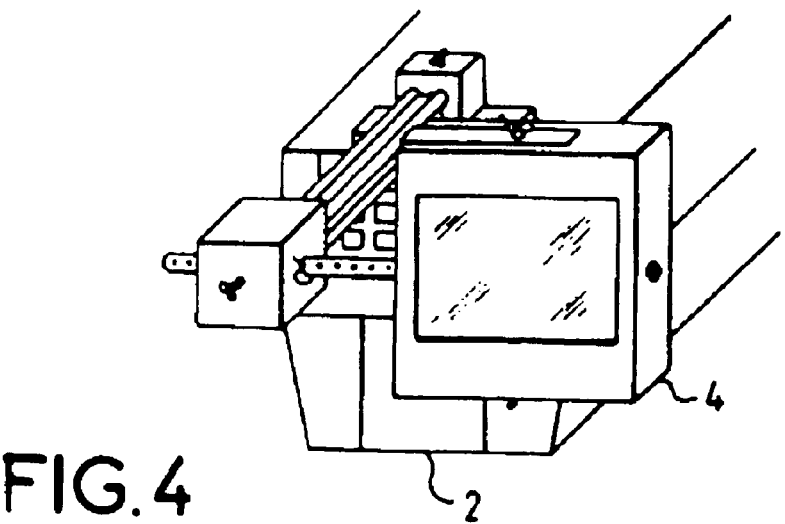
Figure 5:
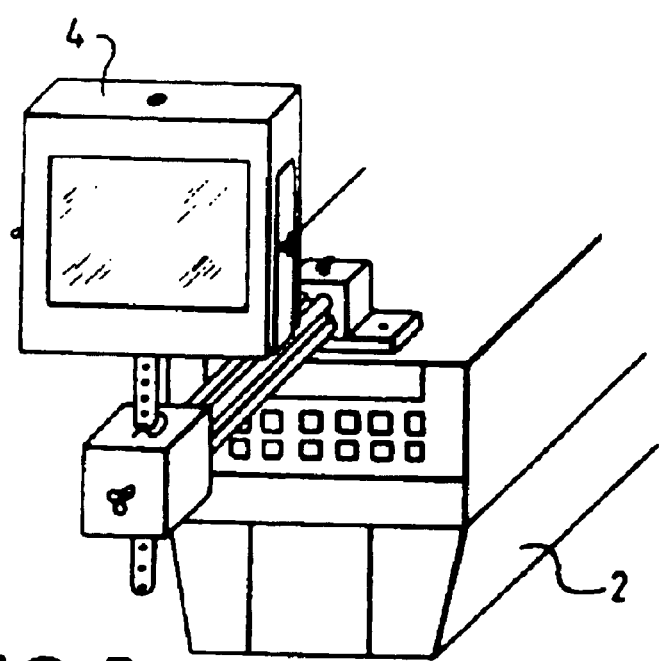

FIGS. 4 and 5 show two other possibilities of mounting the rail 10 in the slider 11. Thus in FIG. 4, it may be seen that it is possible to offset the viewfinder 4 to one side if the clearance behind the camera 1 does not make it possible to have room for a cameraman. The person skilled in the art will observe that in this position the viewfinder 4 is mounted in the gantry 17 with a rotation of 90° with respect to FIG. 1. FIG. 5 shows the viewfinder 4 in the up position, thereby enabling the cameraman to avoid stooping during a low-angle shot.

Numerous other positions are envisageable. It is possible to position the viewfinder 4 along axes which are not parallel to the sighting axis of the camera. Thus, a cameraman can make a sighting whilst being stationed alongside the camera, making for example a 90° sighting. The use of the device according to the invention makes it possible to use a camera in a zone which is dangerous to the cameraman (risk of various types of projectiles) without exposing him/her. According to a variant, it is also possible to provide for lateral mounting of the boom 5 with respect to the camera body 2.

The preferred embodiment represented in FIGS. 2 to 5 constitutes the best embodiment of the invention. This embodiment has the main advantage of being simple and reliable. Quite obviously, the person skilled in the art can substitute equivalent elements for the various constituent elements of this embodiment. By way of example, the tightening thumbwheels 12, 15, 20 and 21 may be replaced by any other means of tightening or of clamping but this would needlessly increase the complexity of the device.

Figure 6:
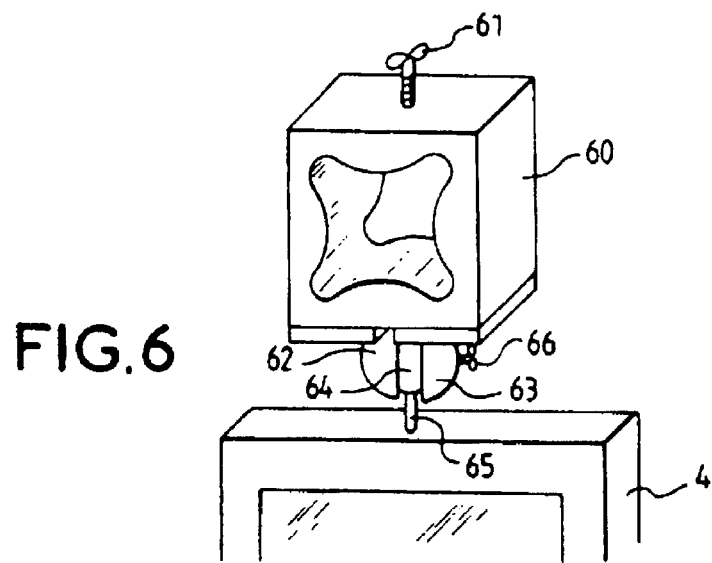
FIGS. 6 to 8 represent variants of the invention.
Figure 7:
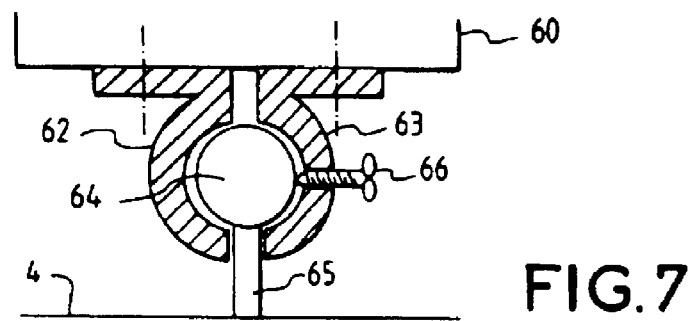

Other more significant variants are possible without, however, departing from the scope of the invention. It is for example possible to use a second fixing means 7, of ball and socket type, as represented in FIG. 6. A support 60 comprises an opening intended to receive the rail 10 and a hole, furnished with a screw thread, which emerges into the said opening. A tightening thumbwheel 61 is screwed into the hole in order to clamp the rail 10 with respect to the support 60. Two spherical half-shells 62 and 63 are fixed to the support 60. A sphere 64, attached securely to the viewfinder 4 by way of a rod 65, is placed between the two half-shells 62 and 63, thus ensuring the ball and socket link between the viewfinder 4 and the support 60. A tightening thumbwheel 66 ensures the clamping of the ball and socket and ensures the retention in position of the viewfinder 4 with respect to the support 60. FIG. 7 shows a sectional view of the two half-shells 62 and 63 of the sphere 64.

Figure 8:
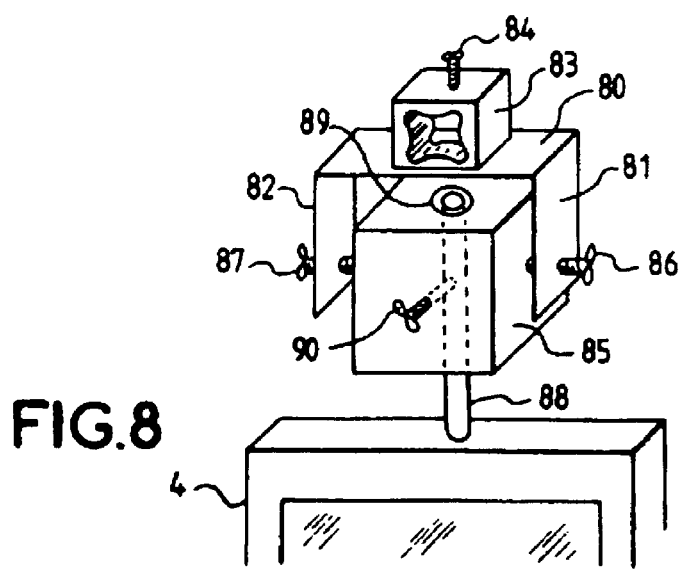

FIG. 8 shows another variant of the second fixing means 7. A gantry 80 is furnished with two arms 81 and 82 and with a slider 83. The slider 83 comprises an opening intended to receive the rail 10 and a hole, furnished with a screw thread, which emerges into the said opening. A tightening thumbwheel 84 is screwed into the hole in order to clamp the rail 10 with respect to the slider 83. A support 85 is placed between the two arms 81 and 82, the rotation and the retention of the support 85 with respect to the gantry 80 being ensured by two tightening thumbwheels 86 and 87.

The support 85 comprises a circular hole for receiving a rod 88 secured to the viewfinder 4. The rod 88 comprises a stop 89 for clamping the translational degree of freedom. A tightening thumbwheel 90 ensures the retention of the viewfinder 4 with respect to the support 85.

The person skilled in the art can appreciate that the devices of FIGS. 6 to 8 use a viewfinder anchoring point which is fixed. If the viewfinder 4 is mounted as represented in FIGS. 4 and 5, a 90° or 180° rotation of the image on the screen of the viewfinder 4 should be carried out.

What is claimed is:

1. Video camera comprising:
    a camera body;
    a lens fixed on the camera body;
    a viewfinder of the flat screen type;
    a boom consisting essentially of a rail which is connected by a first end to the camera body and by a second end to the viewfinder;
    a first fixing means securely attached to the camera body for connecting the boom to the camera body, the said first means allowing on the one hand adjustment of positioning and on the other hand retention in position;
    a second fixing means for connecting the boom to the viewfinder, the said second means allowing on the one hand adjustment of positioning and on the other hand retention in position.

2. Camera according to claim 1, wherein the first fixing means is a sliding link furnished with a means of clamping by braking.

3. Camera according to claim 1, wherein the fixing means is a sliding link consisting of a slider which engages the rail and of a means of tightening, the rail and the slider cooperating so as to ensure translational guidance along a translation axis, the tightening means ensuring retention in position, and in that the rail is secured to the slider, the slider being secured to the camera body.

4. Camera according to claim 3, wherein the rail is a member whose profile remains identical after a 90° rotation about the translation axis.

5. Camera according to claim 1, wherein the second fixing means ensures at least two rotations according to two axes of rotation.

6. Camera according to claim 5, wherein the second fixing means comprises a ball and socket furnished with clamping means.

7. Camera according to claim 5, wherein the second fixing means comprises:
- a gantry attached to the boom, the gantry having two arms opposite one another;
- a tilting support furnished with a circular hole, the said support being placed between the two arms so as to be able to tilt according to a first axis of rotation;
- first means of retention for retaining the tilting support in position between the two arms;
- a rod secured to the viewfinder and placed in the circular hole, and furnished with a stop so that only rotation is possible;
- second means of retention for retaining in position the rod in the tilting support.

8. Camera according to claim 5, wherein the second fixing means comprises:
- an element secured to the boom, the said element being furnished with a circular hole;
- a rod of circular section mounted slidably in the circular hole;
- first clamping means for ensuring the clamping of the rod with respect to the element;
- a gantry secured to the rod having two arms intended to surround the viewfinder whilst ensuring rotation of the viewfinder with respect to the gantry;
- second clamping means for ensuring the clamping of the viewfinder with respect to the gantry.

9. Camera according to claim 8, wherein the rod is furnished with adjustable means of translational clamping.

10. Camera according to claim 8, wherein the viewfinder comprises guidance holes distributed over four sides so as to allow several orientations of mounting of the viewfinder with respect to the gantry.

11. Camera according to claim 1, wherein the boom extends towards the rear of the camera so that a possible position of the viewfinder lies in the extension of the optical axis of the lens.

12. Video camera comprising:
- a camera body;
- a lens fixed on the camera body;
- a viewfinder of the flat screen type;
- a boom which is connected by a first end to the camera body and by a second end to the viewfinder;
- a first fixing means for connecting the boom to the camera body, the said first means allowing on the one hand adjustment of positioning and on the other hand retention in position; and,
- a second fixing means comprising a ball and socket furnished with clamping means for connecting the boom to the viewfinder and ensuring at least two rotations according to two axes of rotation, the said second means allowing on the one hand adjustment of positioning and on the other hand retention in position.

13. Video camera comprising:
- a camera body;
- a lens fixed on the camera body;
- a viewfinder of the flat screen type;
- a boom which is connected by a first end to the camera body and by a second end to the viewfinder;
- a first fixing means for connecting the boom to the camera body, the said first means allowing on the one hand adjustment of positioning and on the other hand retention in position;
- a second fixing means for connecting the boom to the viewfinder and ensuring at least two rotations according to two axes of rotation, the said second means allowing on the one hand adjustment of positioning and on the other hand retention in position, said second fixing means comprising:
  - a gantry attached to the boom, the gantry having two arms opposite one another;
  - a tilting support furnished with a circular hole, the said support being placed between the two arms so as to be able to tilt according to a first axis of rotation;
  - first means of retention for retaining the tilting support in position between the two arms;
  - a rod secured to the viewfinder and placed in the circular hole, and furnished with a stop so that only rotation is possible; and,
  - second means of retention for retaining in position the rod in the tilting support.

14. Video camera comprising:
- a camera body;
- a lens fixed on the camera body;
- a viewfinder of the flat screen type;
- a boom which is connected by a first end to the camera body and by a second end to the viewfinder;
- a first fixing means for connecting the boom to the camera body, the said first means allowing on the one hand adjustment of positioning and on the other hand retention in position;
- a second fixing means for connecting the boom to the viewfinder and ensuring at least two rotations according to two axes of rotation, the said second means allowing on the one hand adjustment of positioning and on the other hand retention in position, said second fixing means comprising:
  - an element secured to the boom, the said element being furnished with a circular hole;
  - a rod of circular section mounted slidably in the circular hole;
  - first clamping means for ensuring the clamping of the rod with respect to the element;
  - a gantry secured to the rod having two arms intended to surround the viewfinder whilst ensuring rotation of the viewfinder with respect to the gantry; and,
  - second clamping means for ensuring the clamping of the viewfinder with respect to the gantry.

15. Camera according to claim 14, wherein the rod is furnished with adjustable means of translational clamping.

16. Camera according to claim 14, wherein the viewfinder comprises guidance holes distributed over four sides so as to allow several orientations of mounting of the viewfinder with respect to the gantry.

* * * * *